United States Patent
Avery et al.

(10) Patent No.: US 11,167,412 B2
(45) Date of Patent: Nov. 9, 2021

(54) MANIPULATOR WITH DETACHABLE HANDLE

(71) Applicant: Delaware Capital Formation, Inc., Wilmington, DE (US)

(72) Inventors: Amos E. Avery, Orlando, FL (US); Isaac M. Giesen, Red Wing, MN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 443 days.

(21) Appl. No.: 16/088,750

(22) PCT Filed: Mar. 31, 2017

(86) PCT No.: PCT/US2017/025543
§ 371 (c)(1),
(2) Date: Sep. 26, 2018

(87) PCT Pub. No.: WO2017/173364
PCT Pub. Date: Oct. 5, 2017

(65) Prior Publication Data
US 2020/0298398 A1    Sep. 24, 2020

Related U.S. Application Data (60) Provisional application No. 62/317,072, filed on Apr. 1, 2016.

(51) Int. Cl.
*B25J 13/02* (2006.01)
*B25J 9/10* (2006.01)
(Continued)

(52) U.S. Cl.
CPC ............... *B25J 9/104* (2013.01); *B25J 13/02* (2013.01); *B25J 15/0408* (2013.01); *B25J 17/02* (2013.01); *B25J 3/00* (2013.01); *B25J 9/102* (2013.01)

(58) Field of Classification Search
CPC .... F16G 11/00; B25J 3/00; B25J 9/104; B25J 13/02
(Continued)

(56) References Cited

U.S. PATENT DOCUMENTS

| | | | |
|---|---|---|---|
| 925,293 A | * | 6/1909 | Cheney ................. E04B 1/2604 403/340 |
| 2,695,715 A | | 11/1954 | Goertz et al. |

(Continued)

FOREIGN PATENT DOCUMENTS

| | | |
|---|---|---|
| DE | 10155121 | 6/2003 |
| DE | 202004010809 | 10/2004 |

(Continued)

OTHER PUBLICATIONS

"Response to Communication Pursuant to Rules 161(1) and 162 EPC," for European Patent Application No. 17719756.3 filed May 9, 2019 (5 pages).

(Continued)

*Primary Examiner* — Randell J Krug
(74) *Attorney, Agent, or Firm* — Pauly, DeVries Smith & Deffner LLC (57) ABSTRACT

A manipulator command handle (147, 230, 330) comprising a handle framework (232, 332), a first cable (250, 350) having a first end (252, 352) and a second end, wherein the second end of the first cable is coupled to the handle framework, a first coupler block (241, 341) coupled to the first end of the first cable and a connector configured to reversibly couple to an output shaft (224, 322) of a manipulator wrist joint.

17 Claims, 8 Drawing Sheets

(51) Int. Cl.
*B25J 15/04* (2006.01)
*B25J 17/02* (2006.01)
*B25J 3/00* (2006.01)

(58) Field of Classification Search
USPC .................. 403/310–313, 364, 339–340
See application file for complete search history.

(56) References Cited

U.S. PATENT DOCUMENTS

| | | | | |
|---|---|---|---|---|
| 2,764,301 | A | * | 9/1956 | Goertz ............... B25J 19/002 414/7 |
| 2003/0060927 | A1 | | 3/2003 | Gerbi et al. |

FOREIGN PATENT DOCUMENTS

| | | | |
|---|---|---|---|
| JP | H0542737 | | 6/1993 |
| JP | 2002039150 | | 2/2002 |
| JP | 2002039150 A | * | 2/2002 |
| JP | 2009106606 | | 5/2009 |
| JP | 2019513562 | | 5/2019 |
| WO | 2009057347 | | 5/2009 |
| WO | 2017173364 | | 10/2017 |

OTHER PUBLICATIONS

"Office Action," for Japanese Patent Application No. 2018551146 dated Jan. 12, 2021 (7 pages) with English Translation.

"Installation, Operation and Maintenance Manual for the System 50 Master-Slave Manipulator," Central Research Laboratories, Inc., Red Wing, MN Aug. 7, 1979 (105 pages).

"International Preliminary Report on Patentability," for PCT Application No. PCT/US2017/025543 dated Oct. 11, 2018 (12 pages).

"International Search Report and Written Opinion," for PCT Application No. PCT/US2017/025543 dated Sep. 5, 2017 (19 pages).

"Partial Search Report and Invitation to Pay Additional Fees," for PCT Application No. PCT/US2017/025543 dated Jul. 10, 2017 (14 pages).

* cited by examiner

MANIPULATOR WITH DETACHABLE HANDLE

This application is being filed as a PCT International Patent application on Mar. 31, 2017 in the name of Delaware Capital Formation, Inc., a U.S. national corporation, applicant for the designation of all countries and Amos E. Avery, a U.S. Citizen and Isaac M. Giesen, a U.S. Citizen, inventors only for the designation of all countries, and claims priority to U.S. Provisional Patent Application No. 62/317,072, filed Apr. 1, 2016, the contents of which are herein incorporated by reference in its entireties.

FIELD OF THE TECHNOLOGY

The technology disclosed herein relates generally to a manipulator system and more particularly to a manipulator with a detachable handle.

BACKGROUND

In various industries it is desirable to work, test, assemble, and the like, in an environment that is relatively isolated from normal ambient conditions. For example, in some medical and pharmaceutical applications, it may be preferable for such activities to occur in a substantially cleaner environment, where outside debris and bacteria cannot substantially affect conditions in the clean environment. In another example, it can be preferable for activities to be contained in a substantially dirtier environment, such as hot cells or laboratories, so inside waste does not substantially affect conditions on the outside. It is often necessary to have the capacity to manipulate devices, components, and the like, inside the isolated environment from the outside of the isolated environment without breaching the isolation of the environment itself. In various instances telemanipulators are used to conduct such activities.

Telemanipulators generally have a command arm that is mechanically, electrically, hydraulically, or combinations thereof, connected to a remote arm. The remote arm is positioned on the inside of the isolated environment and the command arm is positioned outside of the isolated environment. The remote arm typically has an end effector, which can be a tong, for example, that interfaces with the contents of the isolated environment. The master arm typically has a command handle. An operator elicits and directs motion of the remote arm by maneuvering the command arm, or more particularly by maneuvering the command handle, and in many instances can perform quite complex tasks through the use of such a device. For example, manual manipulation of the command handle can elicit clasping of a tong of the remote arm via a mechanical communication chain starting at the command handle, extending through the manipulator, and ending at the tong of the remote arm. Typically the portion of the mechanical communication chain extending from the command handle to the command arm is a segment of a cable. It should be noted that the term "cable" as used herein refers to any linear translation mechanisms such as cables, chains, tape, rope, string, and the like. The term "cable" also refers to segments of linear translation mechanisms joined, together.

In manipulator systems it is often necessary to remove the command handle to replace with a different handle or to perform maintenance on the command handle. It is typically a slow and laborious process to remove and replace the command handle because the linear translation mechanism extending to the handle would need to be disconnected from the current handle and re-routed in the replacement handle.

SUMMARY

Some embodiments disclosed herein relate to a cable coupling assembly. The cable coupling assembly has a first cable defining a first end. The cable coupling assembly also has a second cable defining a second end. The cable coupling assembly has a first coupler block releasably coupled to the first end of the first cable. The cable coupling assembly also has a second coupler block releasably coupled to the second cable towards the second end of the second cable. The cable coupling assembly has an attachment structure configured to releasably engage the first coupler block and the second coupler block such that the first coupler block and the second coupler block are fixed.

In some embodiments, the first coupler block defines a housing configured, to receive the second coupler block. In some embodiments, each of the first coupler block and the second coupler block mutually define a channel configured to receive the attachment structure. In some embodiments, the first coupler block includes a first block portion and a first block clamp portion configured to engage the first end of the first cable. In some embodiments, the second coupler block comprises a second block portion and a second block clamp portion configured to engage the second cable towards the second end of the second cable. In some embodiments, the first coupler block and the second coupler block are substantially identical. In some embodiments, the attachment structure is an interference fit mutually defined by the first coupler block and the second coupler block. In some embodiments, the attachment structure comprises a pin receptacle defined by the first coupler block and a pin defined by the second coupler block, wherein the pin receptacle is configured to frictionally engage the pin. In some embodiments, the attachment structure comprises a housing configured to receive the first coupler block and the second coupler block.

Some embodiments of the current technology relate to a manipulator handle. The manipulator handle has a handle framework. The manipulator handle also has a first cable defining a first end and a second end. The second end of the first cable is coupled to the handle framework. The manipulator handle has a first coupler block coupled to the first end of the first cable. The manipulator handle also has a connector configured to reversibly couple to an output shaft of a manipulator wrist joint.

In some embodiments, the manipulator handle further includes an attachment structure, wherein the first coupler block defines a channel configured to slidably receive the attachment structure. In some embodiments, the first coupler block defines an attachment structure configured to receive a second coupler block of the manipulator wrist joint. In some embodiments, the attachment structure comprises a pin opening defined by the first coupler block, wherein the pin opening is configured to frictionally engage a pin of a second coupler block. In some embodiments, the connector comprises a clamp defining an opening that is configured to receive the output shaft of the manipulator wrist joint. In some embodiments, the manipulator handle further includes a manually actuatable clamp lever coupled to the handle framework and in mechanical communication with the connector, wherein the clamp lever is confirmed to selectably engage and disengage the connector.

Some embodiments of the current technology relate to a manipulator system. The manipulator has a handle defining a handle framework. The handle has a first cable defining a first end and a second end. The second end of the first cable is coupled to the handle framework. The manipulator system also has a first coupler block coupled to the first end of the first cable. The manipulator system has a connector. The manipulator system has a command arm. The command arm has a wrist joint. The wrist joint has an output shaft configured to reversibly couple to the connector. The command arm also has a second cable defining a first end. The command arm further has a second coupler block releasably coupled to the second cable towards the first end of the second cable. The manipulator system also includes an attachment structure configured to releasably engage the first coupler block and the second coupler block such that the first coupler block and the second coupler block are fixed. Other embodiments are described herein.

In some embodiments, the manipulator system further includes a through-tube configured to be coupled to the command arm, wherein the second cable is a component in a mechanical communication chain extending adjacent to the through-tube. In some embodiments, the manipulator system further includes a remote arm configured to be coupled to the through-tube, wherein the remote arm has an end effector and second cable is in mechanical communication with the end effector. In some embodiments, the attachment structure comprises an interference fit mutually defined by the first coupler block and the second coupler block. In some embodiments, the attachment structure comprises a pin receptacle defined by the first coupler block and a pin defined by the second coupler block, wherein the pin receptacle is configured to frictionally engage the pin. In some embodiments, the attachment structure comprises a housing configured to receive the first coupler block and the second coupler block.

Other embodiments are described herein.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

Figure 1:
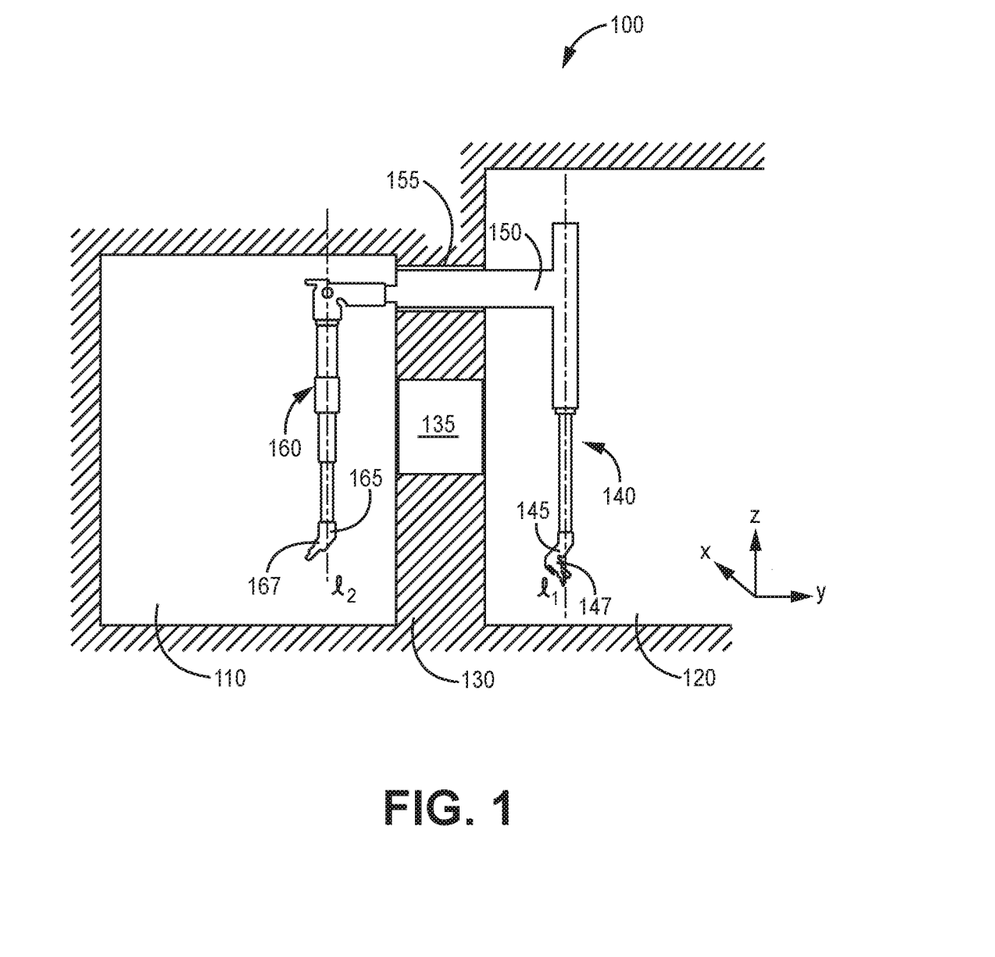
FIG. 1 is an example telemanipulator.

FIG. 1 is an example telemanipulator 100. The telemanipulator 100 is consistent with the technology disclosed throughout this application in various embodiments. The telemanipulator 100 broadly has three main components: a command arm 140, a remote arm 160, and a through-tube 150 that connects the command arm 140 to the remote arm 160. The remote arm 160 is configured to be positioned in an isolated environment 110 for the purpose of manipulating content in the isolated environment 110. The command arm 140 is outside of the isolated environment 110, more specifically in a second environment 120 that is generally accessible to a user. The isolated environment 110 and the second environment 120 are separated by a wall 130 through which the through-tube 150 passes to connect the remote arm 160 to the command arm 140. The wall 130 defines a window 135 through which components in the isolated environment 110 can be viewed from the second environment 120.

The isolated environment 110 is, in a variety of embodiments, sealed off from the second environment 120 so that gases, debris, and the like cannot pass from one environment to the other, including around the through-tube 150 and the window 135. In some other embodiments, the isolated environment 110 is not sealed off from the second environment 120. The isolated environment 110 can be a hot cell, for example.

In various embodiments, the telemanipulator 100 can configured so that, when a user maneuvers the command arm 140 in a particular manner ("directive motion") in the second environment 120, the remote arm 160 responds with substantially corresponding movements ("responsive motion") in the isolated environment 110. The command arm 140 can be directed in one or more of the X-axis, Y-axis, Z-axis, and Z-axis azimuth directions. The X-axis motion is defined by rotation of the command arm 140 about an axis parallel to the Y-axis. The Y-axis motion is defined by rotation of the command arm 140 about an axis parallel to the X-axis. The Z-axis motion is defined by linear motion along the longitudinal axis 11 of the command arm 140. Depending on the orientation of the command arm 140, extension or retraction of the command arm 140 along its longitudinal axis 11 wilt not always be aligned with the Z-axis in space. However, for purposes of this application, extension or retraction of the command arm 140 along its longitudinal axis 11 shall be referred to as being in the Z direction. The Z-axis azimuth direction is rotation about the longitudinal axis 11 of the command arm 140. The responsive motion of the remote arm 160 is likewise in one or more of the x-axis, y-axis, z-axis and z-axis azimuth directions.

The command arm 140 has a command wrist joint 145 and a command handle 147 by which to further facilitate directive motions. The command wrist joint 145 is positioned between the distal end of the command arm 140 and the command handle 147. Correspondingly, the remote arm 160 has an end effector 167, which is a tong in some embodiments, and a remote wrist joint 165. The remote wrist joint 165 is positioned between the distal end of the remote arm 160 and the end effector 167.

In some embodiments the command handle 147 incorporates a trigger that, when engaged, produces a grasping responsive motion in the end effector 167 of the remote arm 160. The command handle 147 can have a ratchet device capable of maintaining the grasp of the end effector 167. The ratchet is capable of being locked in or locked out of engagement. The command handle 147 also can have an adjustment screw to adjust the size of the grasp of the end effector 167 for handling objects of various widths. In multiple embodiments it can be desirable to adjust the size of the grasp of the end effector 167 so that it is proportional to the grip sensation of a user operating the command handle 147.

In various embodiments the pivot of the command handle 147 about the command wrist joint 145 results in a slight lift of the command handle 147 relative to the command arm 140. These dual motions are collectively hereinafter referred to as the "elevation and twist" motion. The elevation and twist motion of the command handle 147 can be replicated by the end effector 167 relative to the remote wrist joint 165 and the remote arm 160.

In various embodiments, the remote arm 160 is an independent remotely-removable unit that is interchangeable and couples with the through-tube 150. The remote arm 160 generally extends from a distal end of the through-tube 150. In some embodiments, the remote arm 160 couples to and uncouples from the through-tube 150 without breaking the seal between the isolated environment 110 and the second environment 120. In such embodiments the remote arm 160 can contain a self-aligning, self-locking mechanism for remotely coupling or uncoupling the remote arm 160 to or from the through-tube 150 from outside of the isolated environment 110. The end effector 167 can also be remotely removable and interchangeable with other types of end effectors.

In some embodiments, the command arm 140 can be an independent, interchangeable, removable unit that couples with the through-tube 150 without breaking the seal of the isolated environment 110. In some embodiments, command arm 140 incorporates X-axis, Y-axis and Z-axis motion counterbalance weights for both the command arm 140 and remote arm 160.

The through-tube 150 is a sealed unit capable of transmitting directive motion from the second environment 120 to the isolated environment 110 while keeping the isolated environment 110 isolated. The through-tube generally has a proximal end 151 and a distal end 152. The proximal end 151 is configured to be positioned towards, and in some embodiments, extend into the second environment 120. The distal end 152 is configured to be positioned towards, and in some embodiments, extend into the isolated environment 110. In a variety of embodiments, one or more seals are disposed within the through-tube 150 towards the command end of the through-tube 150. In some example embodiments, the space in between each pair of seals is filled with grease. In embodiments where the through-tube seals off the isolated environment 110 or otherwise separates the isolated environment 110 from the second environment 120, the through-tube can be referred to as a seal tube.

In at least one embodiment the through-tube 150 seals off the isolated environment 110 through a wall tube 155 that sealably extends through at least a portion of the wall 130 from the second environment 120 to the isolated environment 110. In a variety of embodiments, the through-tube 150 is sealably disposed within the wall tube 155. As an example, the through-tube 150 can be sealably disposed within the wall tube 155 with seals such as one or more nitrile rubber spring-loaded lip seals sealed towards the end of the wall tube 155 towards second environment 120. If multiple seals are used, the space between the seals can be filled with grease. Such a configuration allows the through-tube 150 to rotate within the wall tube 155 while maintaining the isolation of the sealed isolated environment 110. The through-tube 150 can be configured to engage command arms and remote arms having a variety of different configurations that can vary to fit the needs of particular applications.

In some embodiments the through-tube 150 seals to the second environment 120 side of the wall 130. There can be a contamination barrier between the through-tube 150 and the wall tube 155, located on the isolated end of the through-tube 150, Such a contamination hairier can be consistent with those known in the art. In some embodiments, the through-tube 150 mounts and seals to the inside diameter of the wall tube 155 towards the second environment 120 side of the wall tube 155. Such a seal can be a pair of neoprene, nitrile, and/or viton rings, for example, which are compressed axially and expand to seal the through-tube 150 assembly to the inside diameter of the wall tube 155.

In addition to executing movements in response to directive motion from the command arm 140, the remote arm is also configured to execute movements in response to directive input from the command arm 140. The manipulator 100 has motor-driven movements that are accessed through manually operated inputs in the second environment 120 that provide directive input to the remote arm 160 by engaging a motor. Such motor-driven movements can be referred to as "indexing." Generally, a motor is configured to effect reversible motion of the remote arm 160. The motor is in mechanical communication with the remote arm 160 along the length of the through-tube 150. The motor can be an electrical motor, but other types of motors are certainly contemplated. The directive input from the command arm 140 can be electrical input to the motor. The command arm 140 can incorporate user inputs such as triggers, toggles, buttons, switches, and the like for any number of commands that serve as directive input. Such user inputs can be disposed on the command arm 140 including the command wrist joint 145 and the command handle 147.

In some embodiments, indexing of the remote arm 160 is enabled in the X-axis, Y-axis and Z-axis directions. The X-axis motion is defined by rotation of the remote arm 160 about an axis parallel to the Y-axis. In some embodiments the remote arm 160 can be indexed up to 45° in either X-axis direction relative to the command arm 140, The Y-axis motion is defined by rotation of the remote arm 160 about an axis parallel to the X-axis. In some embodiments the remote arm 160 is capable of being indexed from 90° to −15° relative to the remote arm 160 position perpendicular to the plane defined by the X-axis and the Y-axis, where a positive angle is defined as movement away from the wall 130. The Z-axis motion is defined by linear motion along the longitudinal axis 12 of the remote arm 160. In some embodiments, the motor is capable of lifting 100 pounds (45 kg) in the Z-axis direction.

Indexing the remote arm 160 is initiated through an indexing mechanical communication chain that transmits the directive inputs originating at the command arm 140 to the remote arm 160. Directive inputs, which are generally indexed movements described above, can be disposed on the command arm 140, and are generally referred to as being inputted from the command arm 140 for purposes of this application. Furthermore, for purposes of this application, the combination of elements that contribute to the responsive motion of the remote arm 160 in response to directive motions and inputs of the command arm 140 are referred to as mechanical communication chains. In various embodiments the mechanical communication chain is a substantially mechanical system that can incorporate electronic elements. In some embodiments the mechanical communication chain is a substantially electronic system that incorporates mechanical elements. Such mechanical communication chains generally originate from a directive motion or directive input at the command arm 140 and eventually leads to corresponding responsive motion of the remote arm 160. The mechanical communication chains can have a variety of gears, pulleys, chains, cables, tapes, belts, drums, motors, links, and the like that are configured to receive directive motions and directive inputs from the command arm 140 to elicit responsive motion of the remote arm 160.

Generally each axis of motion available to the remote arm 160 through directive motion or directive input has a particular mechanical communication chain associated with it. A first mechanical communication chain is configured to direct the remote arm 160 along a first axis in response to a directive input of the command arm 140. The first axis can be the X-axis in multiple embodiments. A second mechanical communication chain is further configured to direct the remote arm 160 along a second axis in response to the directive input of the command arm 140. In various embodiments the second axis is the Y-axis. A third mechanical communication chain is configured to direct the remote arm 160 along a third axis in response to the directive input of the command arm 140, which can be the Z-axis. In some embodiments, the command arm 140 is in mechanical communication with the remote arm 160. The command arm 140 can be in mechanical communication with the remote arm 160 through a mechanical communication chain extending through or adjacent to the length of the through-tube 150. A fourth mechanical communication chain is configured to direct the remote arm 160 about the third axis in response to the directive of the command arm 140, which can correspond to the Z-axis azimuth responsive motion.

Figure 2:
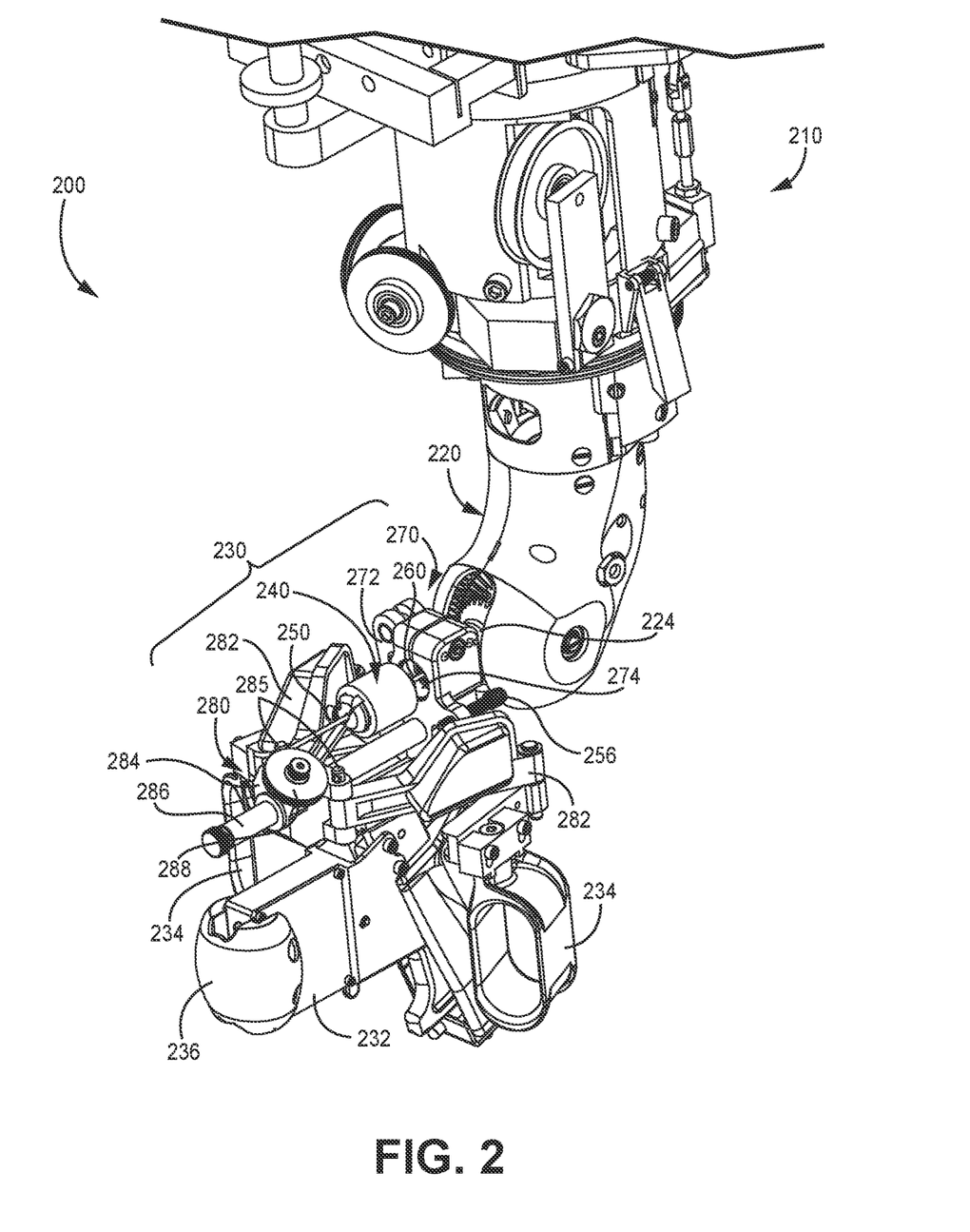
FIG. 2 is a perspective view of a master arm assembly consistent with the technology disclosed herein.
Figure 3:
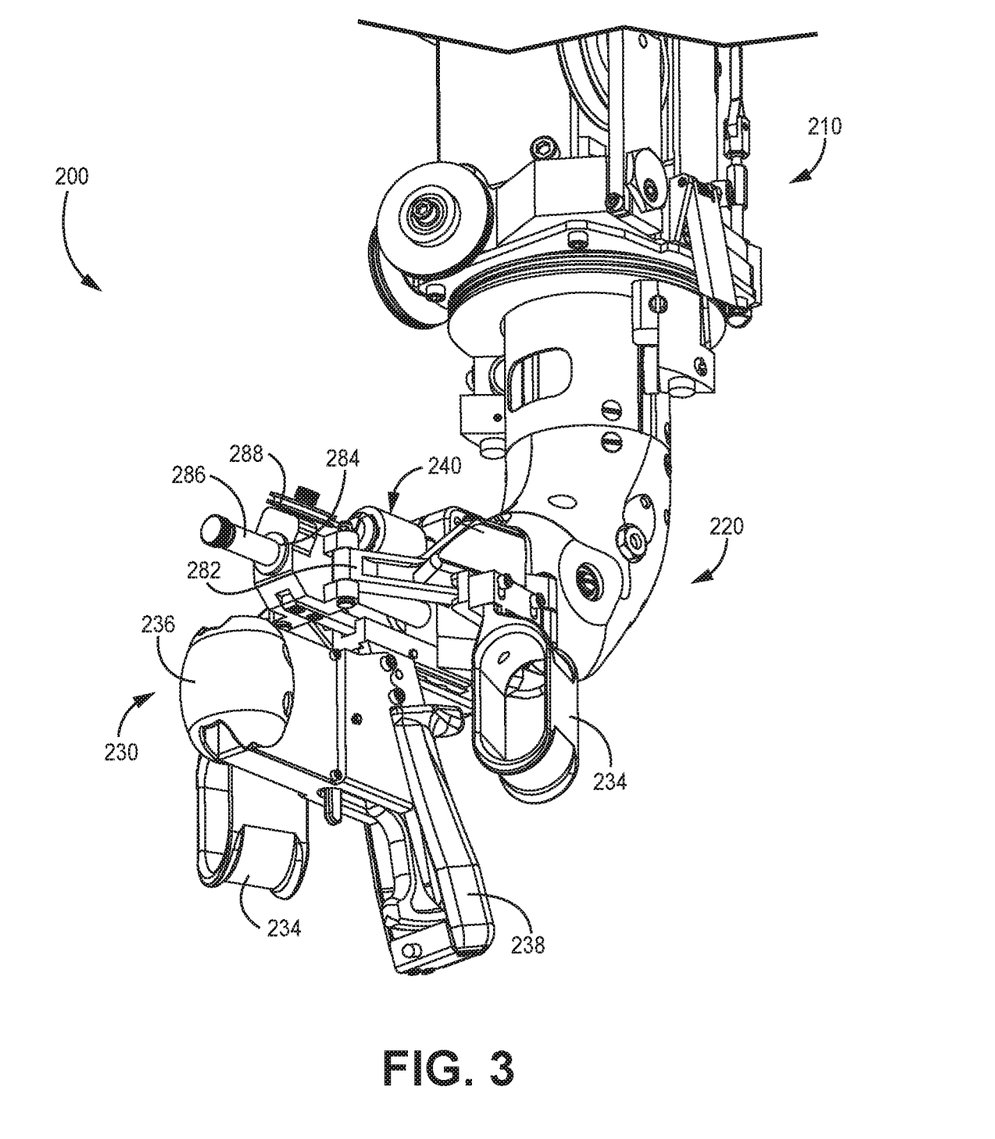
FIG. 3 is a perspective view of the master arm assembly of FIG. 2 from a different angle.
Figure 4A:
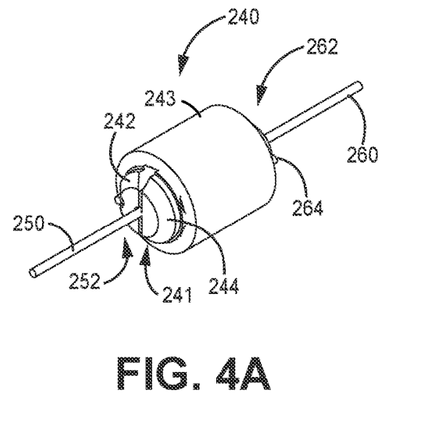
FIG. 4A is a perspective view of an example cable coupling assembly consistent with the technology disclosed herein.
Figure 4B:
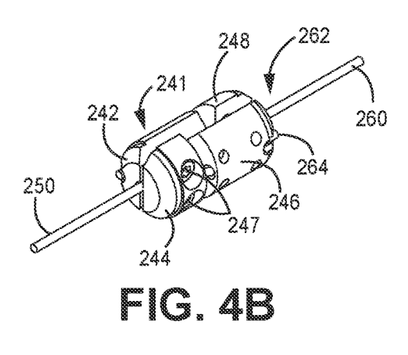
FIG. 4B is a perspective view of another example cable coupling assembly.
Figure 4C:
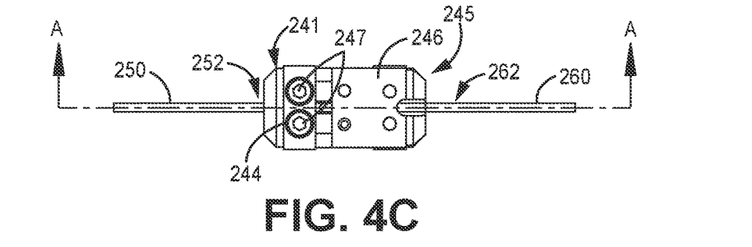
FIG. 4C is a side view of the cable coupling assembly of FIG. 4B.
Figure 4D:
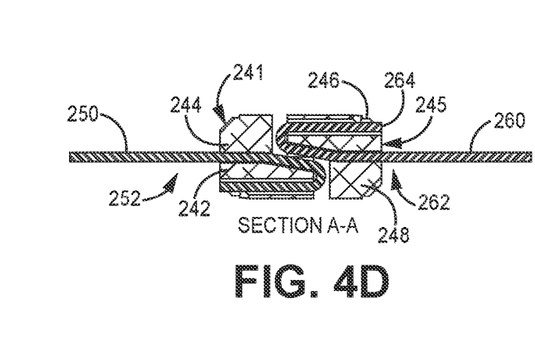
FIG. 4D is a cross-sectional view of FIG. 4C.
Figure 4E:
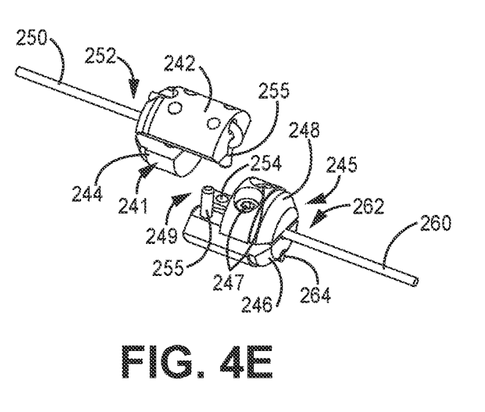

FIG. 2 is a perspective view of an example command arm 200 having a command wrist joint 220 and the command handle 230 coupled to the command wrist joint 220. FIG. 3 is a perspective view of the example command arm 200 of FIG. 2 from a second direction. The command handle 230 is generally configured to receive directive motions and direction inputs from a user to result in responsive motion in the remote arm as discussed above with reference to FIG. 1. The command handle 230 is also generally configured to detachably couple to the command wrist joint 220 by a user. In some embodiments the command handle 230 is configured to both couple to and detach from the command wrist joint 220 without the use of tools by a user.

The command handle 230 generally defines a handle framework 232 that defines the general structure of the command handle 230. The command handle 230 is generally configured to be grasped by a user. The command handle 230 generally has user inputs through which the user can provide directive motion and/or directive input. For example, the command handle 230 has finger receptacles 234 that are configured to receive the fingers of a user. In examples, one of the finger receptacles 234 is configured to receive a thumb of the user and the other of the finger receptacles 234 is configured to receive one or more other fingers of a user, such as a pointer finger and a middle finger. The finger receptacles are generally translatably disposed on the handle framework 232.

The command handle 230 can also have additional surfaces and structures that are configured to be grasped by a user. In examples consistent with the current embodiment, the command handle 230 has a secondary grip 236 configured to be grasped by a user. The secondary grip 236 can provide stability for a user resulting from using two hands to provide directive motion to the manipulator. The command handle 230 also has a pistol grip 238 in embodiments. The pistol grip 238 can be grasped by a user to provide directive input to the manipulator, and/or to access additional functionality available at the command handle 230.

A grasping motion by a remote tong of the manipulator is generally the result of directive motion executed by a user at the command handle 230. The directive motion is generally a squeezing motion on command handle 230 components that is translated through a mechanical communication chain that extends to the remote tong. In the current embodiment, the directive motion is translating the finger receptacles 234 of the command handle 230 towards each other. In response, a remote tong on the isolated side of the manipulator executes a grasping motion. Furthermore, when the finger receptacles 234 are translated away each other by a user, the remote tong on the isolated side of the manipulator executes a releasing motion.

The mechanical communication chain in mechanical communication with the finger receptacles 234 can have a variety of particular configurations, but in general the mechanical communication chain has a cable 260 that extends from the command handle 230 through the command wrist joint 220 to the command arm 210. In some embodiments the cable 260 additionally extends through or adjacent to the manipulator through-tube (see FIG. 1) and can even extend further to the end effector. Regardless of the specific extension of the cable 206 across the manipulator, the cable 260 is in mechanical communication with the end effector of the remote arm of the manipulator through a mechanical communication chain. The cable 260 is configured to linearly translate in response to translation of the finger receptacles 234, and that linear translation of the cable 260 is transmitted further down the mechanical communication chain along the through-tube to result in a grasping motion of the end effector.

In this particular embodiment, a linkage assembly 280 causes translation of the cable 260 in response to translation of the finger receptacles 234. The linkage assembly 280 has symmetrically disposed links 282 coupled to a slider 284 at pivot points 285. The slider 284 is slidably disposed on a slider guide 286. As the finger receptacles 234 are translated towards each other by a user, the links 282 effect translation of the slider 284 along the slider guide 286 toward the distal end of the slider guide 286. The slider guide 286 provides a bearing surface for the slider 284, limiting translation of the slider 284 to the direction of extension of the slider guides 286.

The slider 284 is coupled to a pulley 288 that guides a portion of a first cable 250. The first cable 250 is coupled to a cable coupling assembly 240 at one end and the handle framework 232 via an adjustment screw 256 at the other end that generally remains fixed. The cable coupling assembly 240 is also coupled to a second cable 260 such that the first cable 250, the second cable 260, and the cable coupling assembly 240 form a single linear translation mechanism so that linear translation of the first cable 250 results in equal linear translation of the second cable 260. As such, when the slider 284 slides along the slider guide, the second cable 260 is linearly translated.

The adjustment screw 256 is configured to adjust the position of the second end of the first cable 250. The adjustment screw 256 can be a threaded screw that adjusts the position of the second end of the first cable 250 as the adjustment screw 256 is rotated. By changing the position of the second end of the first cable 250, the adjustment screw 256 can adjust the size of the grasp of the remote tong for handling objects of various widths. In multiple embodiments it can also be desirable to adjust the size of the grasp of the tong so that it is proportional to the grip sensation of a user operating the command handle 230.

It will be appreciated that the linkage assembly 280 can have a variety of different configurations that can be vastly different than the one described herein. In some examples no pulley is incorporated in the system which, compared to the current system, would approximately halve the linear translation of the second cable 26. In some embodiments, the adjustment screw 256 is omitted and the second end of the first cable 250 is fixed relative to the handle framework 232 through any means. Other modifications can also be made.

In example embodiments consistent with FIGS. 2 and 3, the handle 230 is removable from the command wrist joint 220. In particular, command handle 230 has a connector 270 and the command wrist joint 220 of the command arm 210 has an output shaft 224 configured to reversibly couple to the connector 270, In a variety of embodiments the connector 270 defines an opening 274 that is configured to receive the output shaft 224 of the command wrist joint 220. In some embodiments the connector 270 has a clamp that is configured to clamp to the output shaft 224 of the command wrist joint 220. In such embodiments, a manually actuatable clamp lever 272 can be in mechanical communication with the connector 270 and configured to selectively engage and disengage the connector 270. The clamp lever 272 is coupled to the handle framework 232.

The cable coupling assembly 240 also enables command handle 230 detachment from and attachment to the command wrist joint 220. In particular, the cable coupling assembly 240 couples the first cable 250, which is a component of the command handle 230, and the second cable 260, which is a component of the command wrist joint 220. The cable coupling assembly 240 will now be described with reference to FIGS. 4A-4E.

An example cable coupling assembly 240 is depicted in FIGS. 4A-4E which can be viewed, in conjunction with this description. The cable coupling assembly 240 generally couples a first cable 250 defining a first end 252 to a second cable 260 defining a second end 262. The cable coupling assembly 240 has a first coupler block 241 releasably coupled to the first end 252 of the first cable 250. The cable coupling assembly 240 has a second coupler block 245 releasably coupled to the second cable 260 towards the second end 262 of the second cable 260.

The cable coupling assembly 240 also has an attachment structure configured to releasably engage the first coupler block 241 and the second coupler block 245 such that the first coupler block 241 and the second coupler block 245 are fixed. A housing 243 can be a component of the attachment structure. In some embodiments, the attachment structure is additionally or alternatively an interference fit 249 mutually defined by the first coupler block 241 and the second coupler block 245 visible in FIG. 4E. For example, the second coupler block 245 can define pin receptacle 254 and the first coupler block 241 can define a pin 255 that is configured to be frictionally engaged by the pin receptacle 254. In some embodiments both the first coupler block 241 and the second coupler block 245 define both a pin 255 and a pin receptacle 254.

In some embodiments the housing 243 can be omitted. In some embodiments the housing 243 is an outer sleeve that is configured to be manually slid over the first coupler block 241 and the second coupler block 245. In such embodiments the housing 243 can be the sole attachment structure, and in other embodiments the housing 243 can reinforce other attachment structures, such as embodiments where there is an interference fit between the first coupler block 241 and the second coupler block 245. The housing 243 can be constructed of a variety of materials and combinations of materials. In some examples the housing 243 is a flexible sleeve such as a rubber sleeve. In some examples the housing 243 is a rigid sleeve such as a metal sleeve.

The first coupler block 241 has a first block portion 242 and a first block clamp portion 244 configured to engage the first end 252 of the first cable 250. Fasteners 247 such as screws can be used to couple the first block portion 242 to the first block clamp portion 244, but in some embodiments other fastening structures can be used to couple the first block portion 242 to the first block clamp portion 244. In some embodiments the first block portion 242 and the first block clamp portion 244 compresses the first end 252 of the first cable 250 when they are coupled.

The first coupler block 241 and the second coupler block 245 have a substantially identical configuration in embodiments. The second coupler block 245 has a second block portion 246 and a second block clamp portion 248 configured to engage the second cable 260 towards the second end 262 of the second cable 260. In some particular embodiments the second block portion 246 and the second block clamp portion 248 are configured to engage the second cable 260 at its second end 262. In some embodiments, a terminus 264 of the second end 262 of the second cable 260 can extend beyond the second coupler block 245, and in some embodiments the terminus 264 of the second end 262 of the second cable 260 is engaged by the second coupler block 245. Fasteners such as screws 247 (FIG. 4E) can be used to couple the second block portion 246 to the second block clamp portion 248, but in some embodiments other fastening structures can be used. In some embodiments the second block portion 246 and the second block clamp portion 248 compresses the second end 262 of the second cable 260 when they are coupled.

The first coupler block 241 and the second coupler block 245 are generally configured to manually detach without the use of tools. The first coupler block. 241 is generally a component of the command handle 230 (FIGS. 2 and 3, for example), and the second coupler block 245 is generally a component of the command wrist joint 220 and/or the command arm 210.

Figure 5:
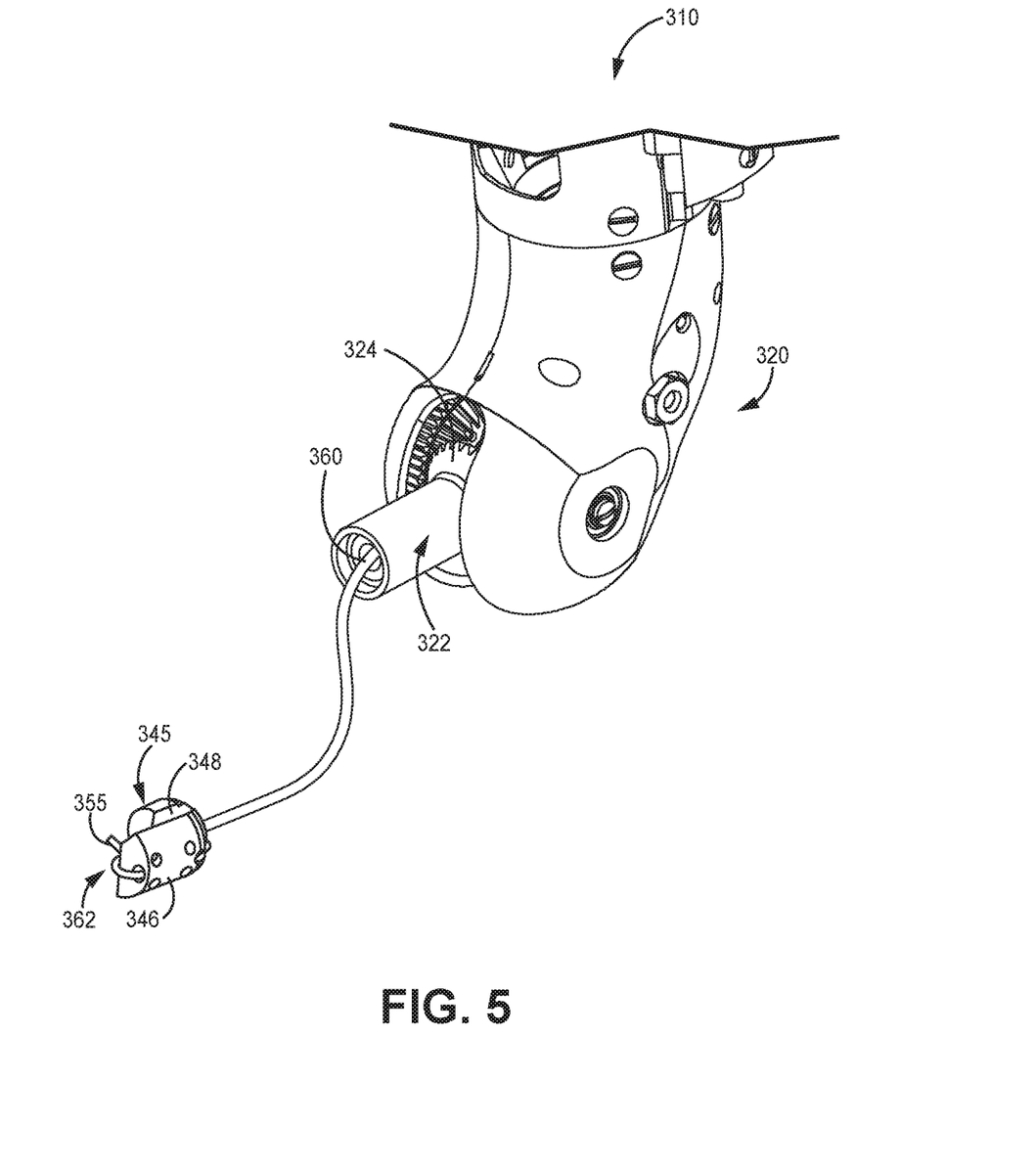
FIG. 5 is an example wrist joint consistent with the technology disclosed herein.

FIG. 5 depicts an example command arm 310 having a wrist joint 320 that is detached from a manipulator handle. The wrist joint 320 is generally a component of a command arm 310 which is highly simplified in the drawing. The wrist joint 320 has an output shaft 322 configured to reversibly couple to a connector 370 of a command handle (see FIG. 2 for example). The command arm 310 has a second cable 360 defining a second end 362. A second coupler block 345 is releasably coupled to the second cable 360 towards the second end 362 of the second cable 360.

The command arm 310 is generally configured to be coupled to a through-tube which is coupled to a remote arm having an end effector (see FIG. 1), where the command arm 310 and the remote arm are in mechanical communication. The second cable 360 is generally a component in a mechanical communication chain extending adjacent to the through-tube, such as through the through-tube. The second cable 360 is generally in mechanical communication with the end effector of the remote arm.

The second cable 360 extends from the wrist joint 320. The second cable can be similar to cables already described herein. The second cable 360 extends through the output shaft 322. In various embodiments, bearings are disposed in the output shaft 322 between the output shaft and the second cable 360. The output shaft 322 is generally configured to transmit the "elevation and twist" motion of the command handle to the end effector of the remote arm. In the current embodiment, the output shaft 322 has an output gear 324 that transmits the elevation and twist directive motion (described above with reference to FIG. 1) to the mechanical communication chain extending to the remote side of the manipulator.

The second coupler block 345 can be similar to coupler blocks already described herein. In the current embodiment, the second coupler block 345 defines an attachment structure 355 configured to releasably engage a first coupler block (not currently depicted) to fix the second coupler block 345 to the first coupler block. The attachment structure 355 is a pin in the current example and can be configured to form an interference fit with the first coupler block. The second coupler block 345 has a second block portion 346 and a second block clamp portion 348 that are configured to engage the second cable 360 towards the second end 362 of the second cable 360.

Figure 6:
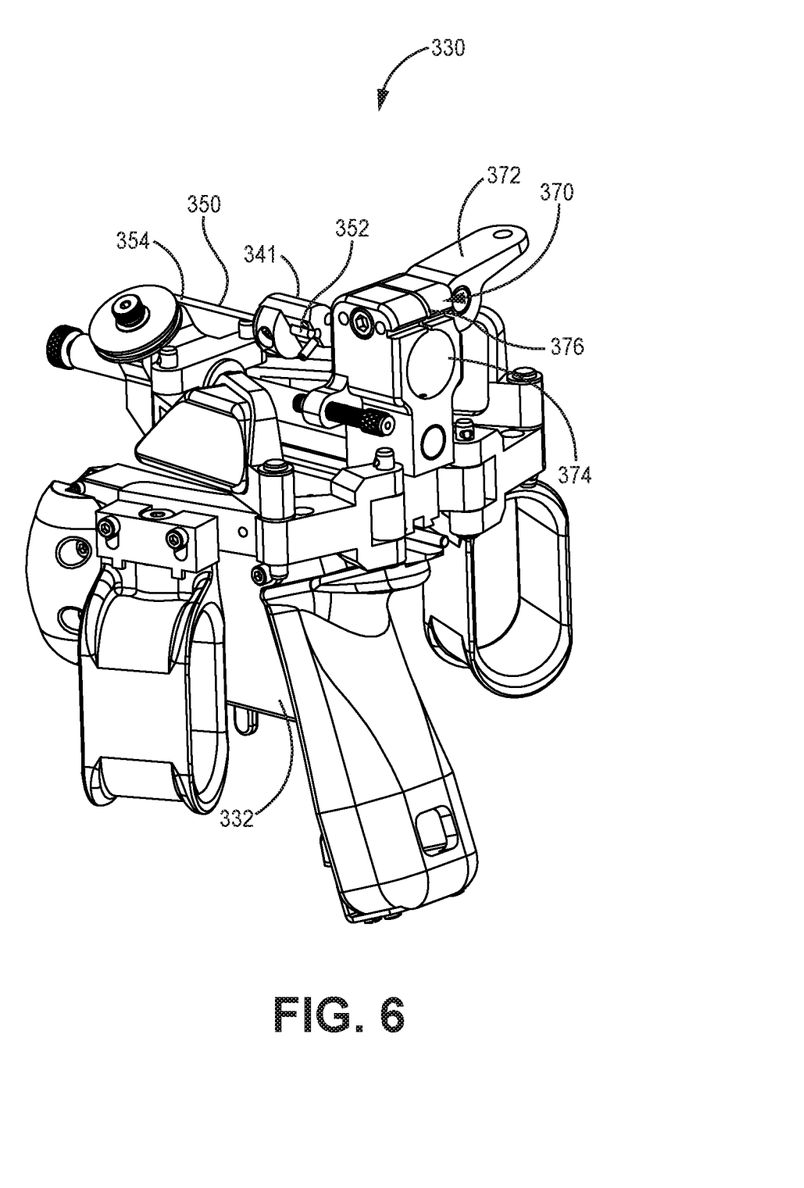
FIG. 6 is an example command handle consistent with the technology disclosed herein.

FIG. 6 is a perspective view of a command handle 330 configured to be coupled to the wrist joint 320 of FIG. 5. The command handle 330 is generally configured to receive directive motion and directive input from a user. The command handle 330 generally defines a handle framework 332 and a first cable 350 defining a first end 352 and a second end 354. The handle 330 has a first coupler block 341 coupled to the first end 352 of the first cable 350. The second end 354 of the first cable 350 is coupled to the handle framework 332. The handle 330 has a connector that is configured to couple to an output shaft of a wrist joint (See FIG. 5).

As described above in the description associated with FIGS. 4A-4D, the first coupler block 341 and the second coupler block 345 (FIG. 5) are releasably engaged by an attachment structure such that the first coupler block 341 and the second coupler block 345 are fixed. The attachment structure can be an interference fit mutually defined by the first coupler block and the second coupler block. For example, the attachment structure can be a pin receptacle defined by the first coupler block 341 and a pin defined by the second coupler block 345, wherein the pin receptacle is configured to frictionally engage the pin. In some embodiments, including that depicted in FIG. 4A, the attachment structure at least in part is a housing configured to receive the first coupler block and the second coupler block.

In the current embodiment the connector 370 of the command handle 330 defines an opening 374 that is configured to receive the output shaft 322 of the wrist joint 320 (FIG. 5). The opening 374 can be configured to frictionally engage the output shaft 322. The opening 374 and the output shaft 322 can define mating features. While in the current embodiment the opening 374 is a cylindrical opening, other shapes are possible. The connector 370 also defines a slot 376 configured to accommodate the second cable 360 of the wrist joint 320. The slot 376 extends from an outer surface of the handle framework 332 to the opening 374. The slot 376 allows positioning of the second cable 360 to extend through the opening 374 without needing to thread the second cable 360 through the opening 374 when inserting the output shaft 322 into the opening 374.

As described above in association with FIGS. 2 and 3 the connector 370 can have a clamp in communication with the opening 374. The clamp can be in mechanical communication with a manually actuatable clamp lever 372 coupled to the handle framework 332. The clamp lever 372 is configured to selectably engage and disengage the connector 370. The clamp lever 372 can enable connection and disconnection of the command handle 330 and the wrist joint 320 by a user without the use of tools.

Figure 7:
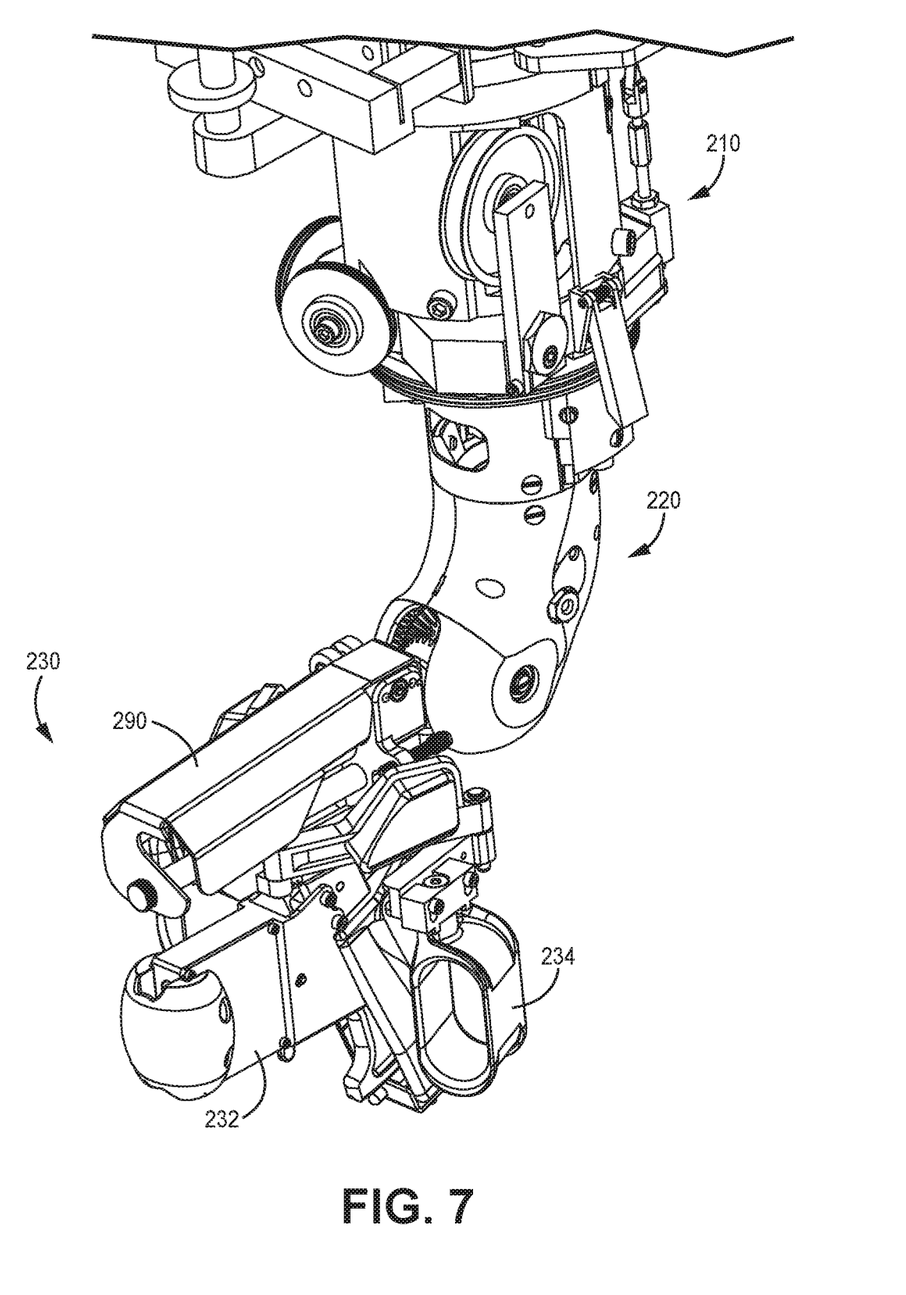
FIG. 7 is a perspective view of another example master arm assembly.

FIG. 7 depicts an example command arm generally consistent with FIGS. 2 and 3 with a cover assembly 290 disposed over the linear translation mechanism that is the first cable 250, the cable coupling assembly 240, and the second cable 260 depicted in Ha 2. The cover assembly 290 can generally be configured to prevent interference with the components of the linear translation mechanism. The cover assembly 290 can also be configured to provide an additional gripping surface by a user. The cover assembly 290 can be coupled to the handle framework 332.

Figure 8:
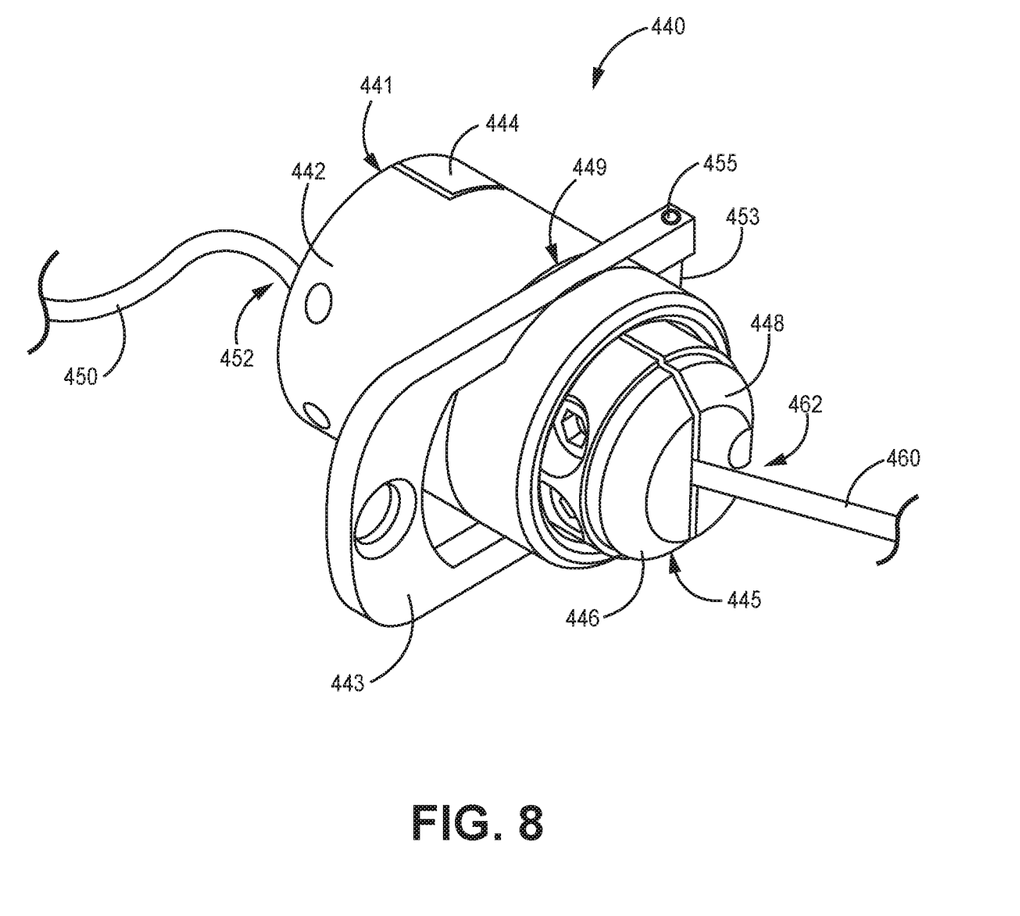
FIG. 8 is a perspective view of another example cable coupling assembly.

FIG. 8 is an exploded view of another example coupling assembly 440 consistent with the technology disclosed herein. The coupling assembly 440 coupled a first cable 450 to a second cable 460. A first coupler block 441 is releasably coupled to a first end 452 defined by the first cable 450. A second coupler block 445 is releasably coupled to the second cable 460 towards the second end 462 of the second cable 460. An attachment structure 443 is configured to releasably engage the first coupler block 441 and the second coupler block 445 such that the first coupler block 441 and the second coupler block 445 are fixed.

The first coupler block 441 has a first block portion 442 and a first block clamp portion 444 configured to engage the first end 452 of the first cable 450, similar to embodiments described above. A variety of fastening structures can be used to couple the first block portion 442 to the first block clamp portion 444.

The second coupler block 445 has a second block portion 446 and a second block clamp portion 448 configured to engage the second cable 460 towards its second end 462. In some embodiments the second block portion 446 and the second block clamp portion 448 compresses the second end 462 of the second cable 460 when they are coupled.

In this example the first coupler block 441 and the second coupler block 445 are not substantially identical. In particular, the first coupler block 441 defines a housing that is configured to receive the second coupler block 445. The second coupler block 445 can be inserted into the first coupler block 441.

Each of the first coupler block 441 and the second coupler block 445 mutually define a channel 449 that is configured to receive the attachment structure 443. The attachment structure 443 is configured to be manually slid through the channel 449 to fix the first coupler block 441 relative to the second coupler block 445, In the current embodiment the attachment structure 443 defines a lock opening 455 configured to receive a locking pin 453. The locking pin 453 can prevent translation of the attachment structure 443 relative to the first coupler block 441 and the second coupler block 445.

The currently-described example coupling assembly 440 can be used in conjunction with manipulators already described herein. The first cable 450 can have a second end coupled to a handle and the second cable 460 can extend from a wrist joint. In other embodiments, the first cable 450 can extend from the wrist joint and a second end of the second cable 460 can be coupled to a handle.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A manipulator system comprising:
a handle defining a handle framework, the handle having:
   a first cable defining a first end and a second end, the second end coupled to the handle framework,
   a first coupler block coupled to the first end of the first cable, and
   a connector; and
a command arm having:
   a wrist joint having an output shaft configured to releasably couple to the connector,
   a second cable defining a first end, and
   a second coupler block releasably coupled to the second cable towards the first end of the second cable; and
an attachment structure configured to releasably engage the first coupler block and the second coupler block such that the first coupler block is fixed to the second coupler block when the first coupler block and the second coupler block are engaged by the attachment structure;
wherein the first coupler block and the second coupler block releasably couple the handle to the command arm at a distal end of the wrist joint; and
wherein the first cable is routed through a turn of approximately 180 degrees in the first coupler block and wherein the second cable is routed through a turn of approximately 180 degrees in the second coupler block.

2. A manipulator system comprising:
a handle defining a handle framework, the handle having:
   a first cable defining a first end and a second end, the second end coupled to the handle framework,
   a first coupler block coupled to the first end of the first cable, and
   a connector; and
a command arm having:
   a wrist joint having an output shaft configured to releasably couple to the connector,
   a second cable defining a first end, and
   a second coupler block releasably coupled to the second cable towards the first end of the second cable; and
an attachment structure configured to releasably engage the first coupler block and the second coupler block such that the first coupler block is fixed to the second coupler block when the first coupler block and the second coupler block are engaged by the attachment structure; and
wherein the first coupler block and the second coupler block releasably couple the handle to the command arm at a distal end of the wrist joint.

3. The manipulator system of claim 2, wherein the attachment structure comprises an interference fit mutually defined by the first coupler block and the second coupler block.

4. The manipulator system of claim 2, wherein the attachment structure comprises a pin receptacle defined by the first coupler block and a pin defined by the second coupler block, wherein the pin receptacle is configured to frictionally engage the pin.

5. The manipulator system of claim 2, wherein the first coupler block is releasably coupled to the first cable towards the first end of the first cable.

6. The manipulator system of claim 2, wherein the first end of the first cable extends from the first coupler block on a first side of the first coupler block and a terminus of the first cable extends the first coupler block on the first side of the first coupler block.

7. The manipulator system of claim 2, wherein the second end of the second cable extends from the second coupler block on a first side of the second coupler block and a terminus of the second cable extends the second coupler block on the first side of the second coupler block.

8. The manipulator system of claim 2, wherein the first cable is routed through a turn of approximately 180 degrees in the first coupler block.

9. The manipulator system of claim 2, wherein the second cable is routed through a turn of approximately 180 degrees in the second coupler block.

10. The manipulator system of claim 2, further comprising a through-tube configured to be coupled to the command arm, wherein the second cable is a component in a mechanical communication chain extending adjacent to the through-tube.

11. The manipulator system of claim 10, further comprising a remote arm configured to be coupled to the through-tube, wherein the remote arm has an end effector and the second cable is in mechanical communication with the end effector.

12. The manipulator system of claim 2, wherein the connector comprises a clamp defining an opening that is configured to receive the output shaft of the manipulator wrist joint.

13. The manipulator system of claim 12, further comprising a manually actuatable clamp lever coupled to the handle framework and in mechanical communication with the connector, wherein the clamp lever is configured to selectably engage and disengage the connector.

14. The manipulator system of claim 2, wherein the first coupler block comprises a first block portion and a first block clamp portion configured to engage the first end of the first cable.

15. The manipulator system of claim 14, wherein the first block clamp portion compresses the first end of the first cable when they are coupled.

16. The manipulator system of claim 2, wherein the second coupler block comprises a second block portion and a second block clamp portion configured to engage the second cable towards the second end of the second cable.

17. The manipulator system of claim 16, wherein the second block clamp portion compresses the second end of the second cable when they are coupled.

* * * * *